United States Patent
Matsunaga et al.

(10) Patent No.: US 12,151,695 B2
(45) Date of Patent: *Nov. 26, 2024

(54) CONTROL DEVICE AND CONTROL METHOD

(71) Applicant: HONDA MOTOR CO., LTD., Tokyo (JP)

(72) Inventors: Hideki Matsunaga, Wako (JP); Masamitsu Tsuchiya, Wako (JP); Masaru Otaka, Wako (JP); Toshiaki Takano, Tokyo (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 17/483,890

(22) Filed: Sep. 24, 2021

(65) Prior Publication Data

US 2022/0009511 A1 Jan. 13, 2022

Related U.S. Application Data

(63) Continuation of application No. PCT/JP2019/014306, filed on Mar. 29, 2019.

(51) Int. Cl.
*B60W 50/08* (2020.01)
*B60W 10/20* (2006.01)
(Continued)

(52) U.S. Cl.
CPC .......... *B60W 50/082* (2013.01); *B60W 10/20* (2013.01); *B60W 10/30* (2013.01);
(Continued)

(58) Field of Classification Search
CPC ....... H04W 48/06; H04W 4/48; H04W 48/04; B60W 10/20; B60W 60/0018; B60W 2555/60

See application file for complete search history.

(56) References Cited

U.S. PATENT DOCUMENTS 6,246,955 B1  6/2001  Nishikawa et al.
9,100,974 B2  8/2015  Carey et al.
(Continued)

FOREIGN PATENT DOCUMENTS

CN   1883135 A   12/2006
CN   105722204 A   6/2016
(Continued)

OTHER PUBLICATIONS

Japanese Office Action for Japanese Patent Application No. 2021-511751 mailed Dec. 23, 2022 (partially translated).
(Continued)

*Primary Examiner* — Mirza F Alam
(74) *Attorney, Agent, or Firm* — Thomas | Horstemeyer, LLP (57) ABSTRACT

A control device of a mobile object includes a control unit configured to restrict, based on information specifying a suppression area where occurrence of a communication delay is to be suppressed, the mobile object from performing an operation that induces a communication delay in the suppression area.

16 Claims, 9 Drawing Sheets

(51) Int. Cl.
  *B60W 10/30* (2006.01)
  *B60W 40/08* (2012.01)
  *B60W 50/00* (2006.01)
  *H04W 36/32* (2009.01)

(52) U.S. Cl.
  CPC . *B60W 2040/089* (2013.01); *B60W 2050/007* (2013.01); *B60W 2555/60* (2020.02); *B60W 2710/30* (2013.01); *H04W 36/326* (2023.05)

(56) References Cited

U.S. PATENT DOCUMENTS

| | | | |
|---|---|---|---|
| 9,526,046 | B2 | 12/2016 | Tanino |
| 9,813,955 | B2 | 11/2017 | Kondo |
| 10,244,456 | B2 | 3/2019 | Yamasaki et al. |
| 10,305,576 | B2 | 5/2019 | High et al. |
| 11,330,497 | B2 | 5/2022 | Niwa et al. |
| 2007/0057845 | A1 | 3/2007 | Miura |
| 2008/0258890 | A1* | 10/2008 | Follmer ............ G08G 1/052 340/439 |
| 2014/0003365 | A1 | 1/2014 | Carey et al. |
| 2015/0183433 | A1* | 7/2015 | Suzuki ............ B60W 10/06 701/96 |
| 2015/0244459 | A1 | 8/2015 | Lindsay |
| 2015/0257058 | A1* | 9/2015 | Tanino ............ H04L 67/12 370/331 |
| 2015/0373594 | A1 | 12/2015 | Kondo |
| 2017/0302362 | A1 | 10/2017 | High et al. |
| 2018/0124233 | A1* | 5/2018 | Abramson ........ H04W 12/30 |
| 2018/0302835 | A1 | 10/2018 | Yamasaki et al. |
| 2019/0238214 | A1 | 8/2019 | High et al. |
| 2020/0336965 | A1 | 10/2020 | Niwa et al. |
| 2021/0014643 | A1* | 1/2021 | Kuroda ............ H04W 4/40 |

FOREIGN PATENT DOCUMENTS

| | | |
|---|---|---|
| CN | 107431967 A | 12/2017 |
| JP | H11-306490 A | 11/1999 |
| JP | 2006-214945 A | 8/2006 |
| JP | 2013-115803 A | 6/2013 |
| JP | 2014-044639 A | 3/2014 |
| JP | 2015-056835 A | 3/2015 |
| JP | 2016-012857 A | 1/2016 |
| JP | 2016-225944 A | 12/2016 |
| JP | 2017-188709 A | 10/2017 |
| JP | 2018-067880 A | 4/2018 |
| JP | 2018-207154 A | 12/2018 |
| JP | 2019-009530 A | 1/2019 |
| JP | 2019-521536 A | 7/2019 |
| JP | 2019-146072 A | 8/2019 |
| WO | 2014/115418 A1 | 7/2014 |
| WO | 2017/180561 A1 | 10/2017 |
| WO | 2017/183072 A1 | 10/2017 |
| WO | 2018/220971 A1 | 12/2018 |
| WO | 2020/202377 A1 | 10/2020 |

OTHER PUBLICATIONS

Chinese Office Action for Chinese Patent Application No. 201980094427.3 mailed Apr. 28, 2023 (partially translated).
International Search Report and Written Opinion for PCT/JP2019/014306 mailed Jun. 4, 2019.

* cited by examiner

| 531 OPERATION MODE | 532 SUPPRESSION AREA | 533 AREA SIZE | 534 DELAY STATE | 535 HANDOVER | 536 DOWNLOAD |
|---|---|---|---|---|---|
| REMOTE DRIVING MODE | VICINITY OF POINT A | WITHIN 50 m | 10 ms OR MORE | LIMITED | LIMITED |
| REMOTE DRIVING MODE | VICINITY OF POINT A | WITHIN 50 m | LESS THAN 10 ms | ALLOWED | LIMITED |
| REMOTE DRIVING MODE | VICINITY OF POINT B | WITHIN 50 m | 15 ms OR MORE | ALLOWED | LIMITED |
| REMOTE DRIVING MODE | VICINITY OF POINT B | WITHIN 50 m | LESS THAN 15 ms | ALLOWED | ALLOWED |
| AUTOMATED DRIVING MODE | VICINITY OF POINT A | WITHIN 30 m | 10 ms OR MORE | ALLOWED | LIMITED |
| AUTOMATED DRIVING MODE | VICINITY OF POINT A | WITHIN 30 m | LESS THAN 10 ms | ALLOWED | ALLOWED |
| AUTOMATED DRIVING MODE | VICINITY OF POINT B | WITHIN 30 m | 15 ms OR MORE | ALLOWED | ALLOWED |
| AUTOMATED DRIVING MODE | VICINITY OF POINT B | WITHIN 30 m | LESS THAN 15 ms | ALLOWED | ALLOWED |
| MANUAL DRIVING MODE | VICINITY OF POINT A | WITHIN 10 m | 10 ms OR MORE | ALLOWED | LIMITED |
| MANUAL DRIVING MODE | VICINITY OF POINT A | WITHIN 10 m | LESS THAN 10 ms | ALLOWED | ALLOWED |
| MANUAL DRIVING MODE | VICINITY OF POINT B | WITHIN 10 m | 15 ms OR MORE | ALLOWED | ALLOWED |
| MANUAL DRIVING MODE | VICINITY OF POINT B | WITHIN 10 m | LESS THAN 15 ms | ALLOWED | ALLOWED |

FIG. 5E

| 541 OPERATION MODE | 542 SUPPRESSION AREA | 543 AREA SIZE | 544 DELAY STATE | 545 HANDOVER | 546 DOWNLOAD |
|---|---|---|---|---|---|
| REMOTE DRIVING MODE | VICINITY OF POINT A | WITHIN 30 m | 10 ms OR MORE | LIMITED | LIMITED |
| REMOTE DRIVING MODE | VICINITY OF POINT A | WITHIN 30 m | LESS THAN 10 ms | ALLOWED | LIMITED |
| REMOTE DRIVING MODE | VICINITY OF POINT B | WITHIN 30 m | 15 ms OR MORE | ALLOWED | LIMITED |
| REMOTE DRIVING MODE | VICINITY OF POINT B | WITHIN 30 m | LESS THAN 15 ms | ALLOWED | ALLOWED |
| AUTOMATED DRIVING MODE | VICINITY OF POINT A | WITHIN 50 m | 10 ms OR MORE | ALLOWED | LIMITED |
| AUTOMATED DRIVING MODE | VICINITY OF POINT A | WITHIN 50 m | LESS THAN 10 ms | ALLOWED | ALLOWED |
| AUTOMATED DRIVING MODE | VICINITY OF POINT B | WITHIN 50 m | 15 ms OR MORE | ALLOWED | ALLOWED |
| AUTOMATED DRIVING MODE | VICINITY OF POINT B | WITHIN 50 m | LESS THAN 15 ms | ALLOWED | ALLOWED |
| MANUAL DRIVING MODE | VICINITY OF POINT A | WITHIN 10 m | 10 ms OR MORE | ALLOWED | LIMITED |
| MANUAL DRIVING MODE | VICINITY OF POINT A | WITHIN 10 m | LESS THAN 10 ms | ALLOWED | ALLOWED |
| MANUAL DRIVING MODE | VICINITY OF POINT B | WITHIN 10 m | 15 ms OR MORE | ALLOWED | ALLOWED |
| MANUAL DRIVING MODE | VICINITY OF POINT B | WITHIN 10 m | LESS THAN 15 ms | ALLOWED | ALLOWED |

CONTROL DEVICE AND CONTROL METHOD

CROSS-REFERENCE TO RELATED APPLICATION(S)

This application is a continuation of International Patent Application No. PCT/JP2019/014306 filed on Mar. 29, 2019, the entire disclosures of which is incorporated herein by reference.

BACKGROUND OF THE INVENTION

Field of the Invention

The present disclosure relates to a control device and a control method.

Description of the Related Art

There is known a remote driving technology in which an operator located at a remote place operates a vehicle. In remote driving, one of required elements is that a communication delay between an operator device for an operator who performs remote driving and a user terminal mounted on a vehicle is sufficiently suppressed. In Japanese Patent Laid-Open No. 2013-115803, the amount of communication is reduced by transmitting difference information of three-dimensional map data of an environment around a vehicle.

SUMMARY OF THE INVENTION

Even in a case where the amount of data communicated between a vehicle and a remote driving device is limited, a communication delay may occur due to an operation such as handover of communication performed by the vehicle. Such a situation is not limited to the vehicle, and the same applies to other mobile objects. Some aspects of the present disclosure provide a technology for suppressing occurrence of a communication delay in a specific area.

In an embodiment, provided is a control device of a mobile object, the control device comprising: a control unit configured to restrict, based on information specifying a suppression area where occurrence of a communication delay is to be suppressed, the mobile object from performing an operation that induces a communication delay in the suppression area.

BRIEF DESCRIPTION OF THE DRAWINGS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
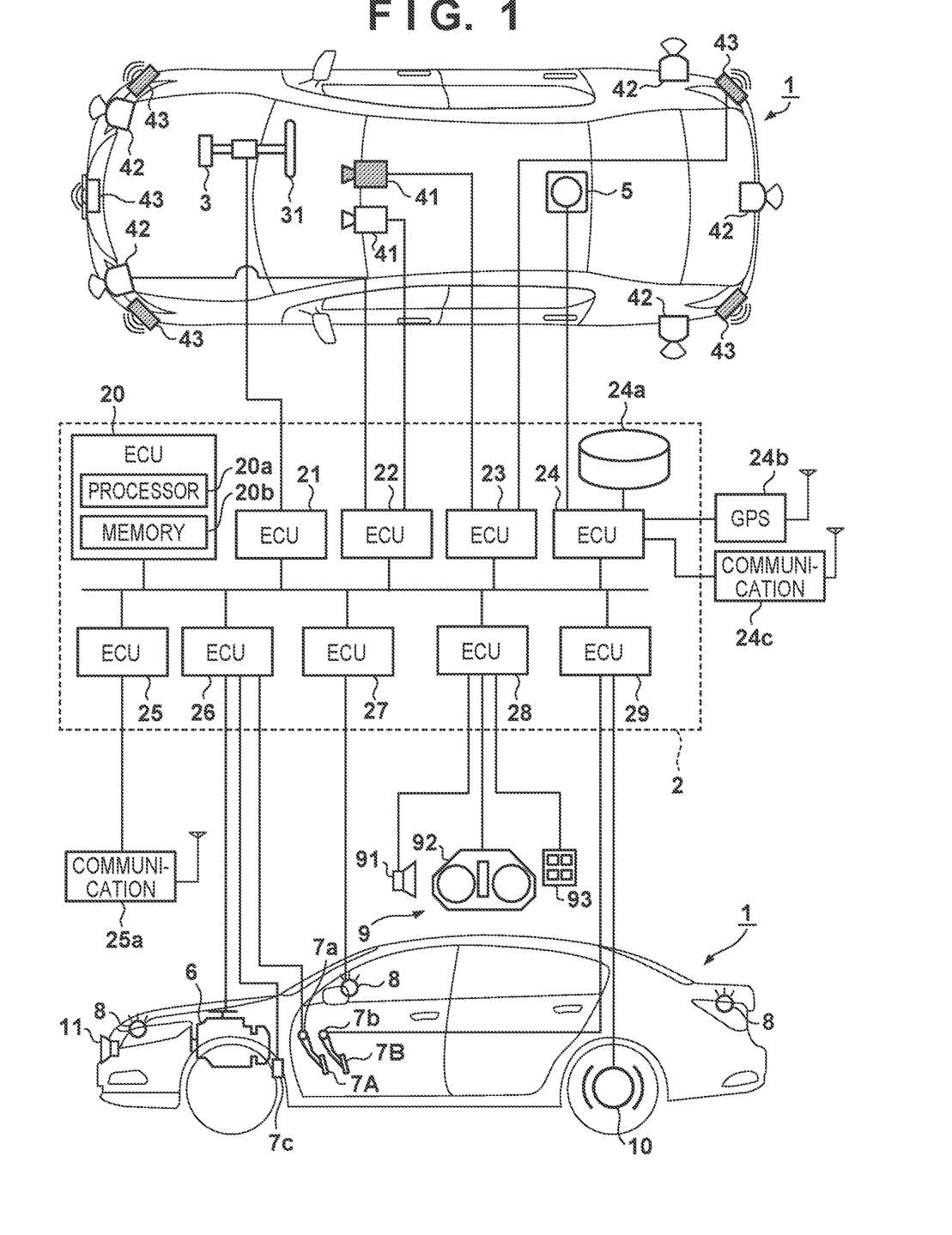
FIG. 1 is a block diagram for describing an example of a configuration of a vehicle according to an embodiment.

A vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 performs a traveling control related to an automated driving function and a remote driving function of the vehicle 1. In the traveling control, the ECU 20 automatically controls steering and/or acceleration/deceleration of the vehicle 1. The automated driving function is a function in which the ECU 20 plans a travel route of the vehicle 1 and controls steering and/or acceleration/deceleration of the vehicle 1 based on the travel route. The remote driving function is a function in which the ECU 20 controls steering and/or acceleration/deceleration of the vehicle 1 in accordance with an instruction from an operator outside the vehicle 1. The operator outside the vehicle 1 may be a person or artificial intelligence (AI). The ECU 20 can also execute the automated driving function and the remote driving function in combination. For example, the ECU 20 may perform the traveling control by planning the travel route while there is no instruction from the operator, and when there is an instruction from the operator, the ECU 20 may perform the traveling control according to the instruction.

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When a driving state of the vehicle 1 is an automated driving state, the ECU 21 automatically controls the electric power steering device 3 according to an instruction from the ECU 20 and controls a traveling direction of the vehicle 1.

The ECUs 22 and 23 control detection units 41 to 43 that detect a situation outside the vehicle and execute information processing on a detection result. The detection unit 41 is a camera that captures an image of the front of the vehicle 1 (hereinafter, referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, and measures a distance to the object. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each radar 43 and executes information processing on the detection result. Since two sets of devices for detecting the surrounding situation of the vehicle are provided, the reliability of the detection result can be improved, and since different types of detection units such as a camera, a lidar, and a radar are provided, the surrounding environment of the vehicle can be analyzed in multiple ways.

The ECU 24 controls a gyro sensor 5, a global positioning system (GPS) sensor 24b, and a communication device 24c and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current position of the vehicle 1. The communication device 24c performs wireless communication with a server that provides map information and traffic information and acquires these pieces of information. The ECU 24 can access a map information database 24a constructed in the memory, and the ECU 24 searches for a route from the current position to a destination and the like. The ECU 24, the map database 24a, and the GPS sensor 24b constitute a so-called navigation device.

The ECU 25 includes a communication device 25a for vehicle-to-vehicle communication. The communication device 25a performs wireless communication with other surrounding vehicles to exchange information between the vehicles. The communication device 25a is also used for communication with an operator outside the vehicle 1.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission based on information such as a vehicle speed detected by a vehicle speed sensor 7c. When the driving state of the vehicle 1 is the automated driving state, the ECU 26 automatically controls the power plant 6 according to an instruction from the ECU 20 and controls the acceleration and deceleration of the vehicle 1.

The ECU 27 controls lighting devices 8 (lamps such as headlight and taillight) including direction indicators (directional signals). In the example of FIG. 1, the lighting devices 8 are provided at the front portion, door mirrors, and the rear portion of the vehicle 1. The ECU 27 further controls a sound device 11 facing the outside of the vehicle, including a horn. The lighting device 8, the sound device 11, or a combination thereof has a function of providing information to the outside of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, information notification may also be made by using vibration or light. In addition, information notification may be made by using a combination of some of the sound, image display, vibration, and light. Furthermore, the combination or the notification mode may vary in accordance with the level (for example, the degree of urgency) of information notification of which should be made. An input device 93 is a switch group that is arranged at a position where the driver can operate it and is used to input an instruction to the vehicle 1. The input device 93 may also include a sound input device. The ECU 28 can perform guidance related to the traveling control of the ECU 20. Details of the guidance will be described later. The input device 93 may include a switch used to control an operation of the traveling control performed by the ECU 20. The input device 93 may include a camera for detecting a line-of-sight direction of the driver.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7b provided on a brake pedal 7B, for example. When the driving state of the vehicle 1 is the automated driving state, the ECU 29 automatically controls the brake device 10 according to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

A configuration of a remote driving device 200 according to some embodiments of the present disclosure will be described with reference to a block diagram of FIG. 2. The remote driving device 200 is a device for providing a remote driving service to a vehicle having the remote driving function. The remote driving device 200 is located away from the service providing target vehicle.

The remote driving device 200 may be capable of providing the remote driving service in a plurality of operation modes. The plurality of operation modes of the remote driving service may include a leading mode and an assisting mode. The leading mode is an operation mode in which the operator of the remote driving device 200 specifies a control amount (for example, a steering angle, an accelerator pedal position, a brake pedal position, a position of a directional signal lever, or on/off of a light) of the vehicle. The assisting mode is an operation mode in which the vehicle (specifically, the ECU 20) determines a control amount of the vehicle in accordance with a path plan specified by the operator of the remote driving device 200. In the assisting mode, the operator of the remote driving device 200 may generate and specify the path plan by himself/herself, or may specify the path plan by adopting a path plan suggested by the vehicle.

Figure 2:
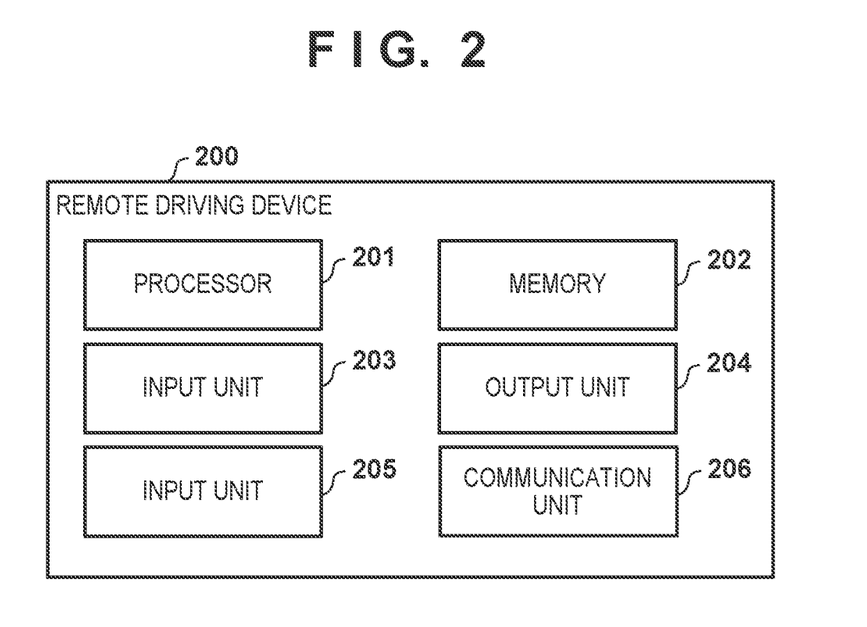
FIG. 2 is a block diagram for describing an example of a configuration of a remote driving device according to the embodiment.

The remote driving device 200 includes each component illustrated in FIG. 2. A processor 201 controls the overall operation of the remote driving device 200. The processor 201 functions as, for example, a CPU. A memory 202 stores programs, temporary data, and the like used for the operation of the remote driving device 200. The memory 202 is implemented by, for example, a ROM or a RAM. An input unit 203 is used by a user of the remote driving device 200 to make an input to the remote driving device 200. The user of the remote driving device 200 is a person who is an operation subject, or is a person (observer) who monitors an operation of AI in a case where the AI is the operation subject. An output unit 204 is used to output information from the remote driving device 200 to the user. A storage unit 205 stores data used for the operation of the remote driving device 200. The storage unit 205 is implemented by a storage device such as a disk drive (for example, HDD or SSD). A communication unit 206 provides a function for the remote driving device 200 to communicate with other devices (for example, a vehicle to be remotely driven), and is implemented by, for example, a network card, an antenna, or the like.

Figure 3:
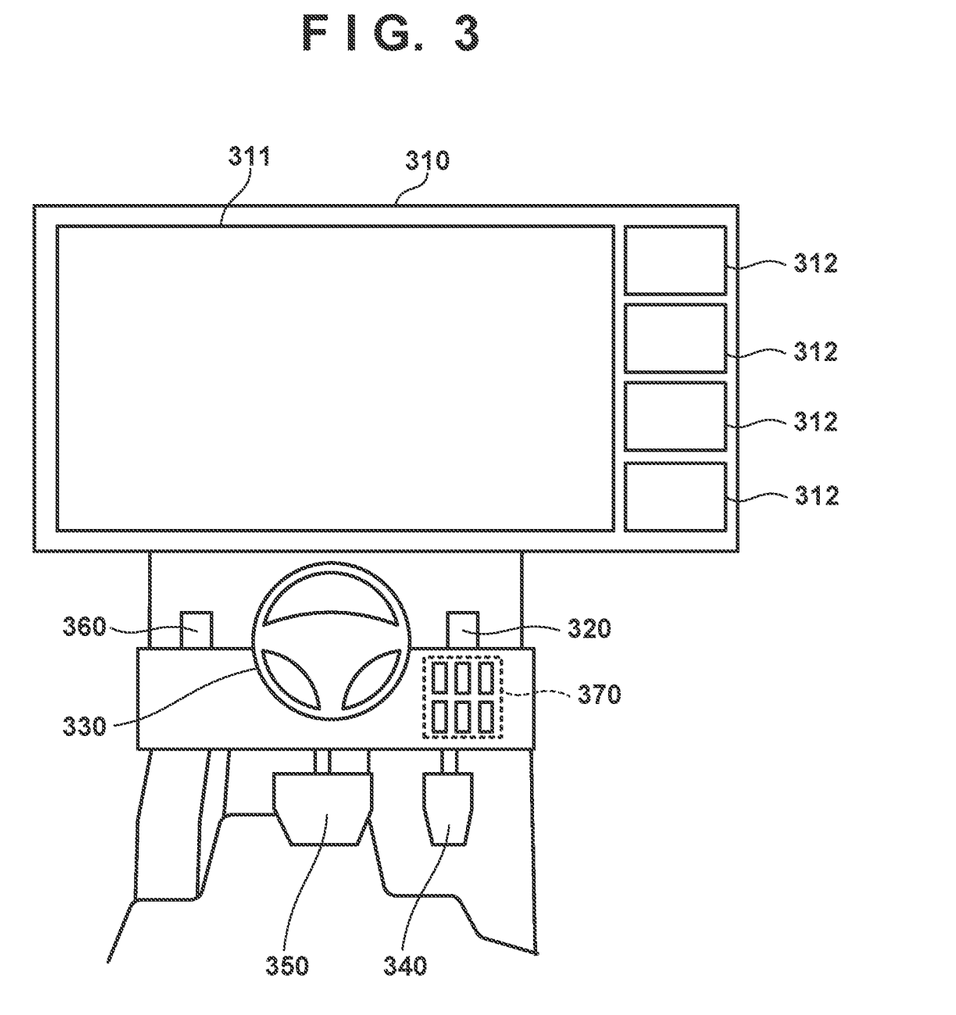
FIG. 3 is a schematic diagram for describing an example of a console for remote driving according to the embodiment.

An example of a configuration of the input unit 203 and the output unit 204 of the remote driving device 200 will be described with reference to the schematic diagram of FIG. 3. In this configuration example, the output unit 204 is implemented by a display device 310 and a sound device 320, and the input unit 203 is implemented by a steering wheel 330, an accelerator pedal 340, a brake pedal 350, a microphone 360, and a plurality of switches 370.

The display device 310 is a device that outputs visual information for providing the remote driving service. The sound device 320 is a device that outputs auditory information for providing the remote driving service. A screen displayed on the display device 310 includes one main region 311 and a plurality of sub regions 312. In the main region 311, information regarding a control target vehicle among a plurality of vehicles to which the remote driving service is provided is displayed. The control target vehicle is a vehicle to which an instruction from the remote driving device 200 is transmitted. In each sub region 312, information regarding a vehicle other than the control target vehicle among the plurality of vehicles to which the remote driving service is provided is displayed. The vehicle other than the control target vehicle may be referred to as a monitoring target vehicle. In a case where the remote driving service is provided to a plurality of vehicles by one remote driving device 200, the operator appropriately switches the vehicle (that is, the control target vehicle) displayed in the main region 311. The information displayed in the main region 311 and the sub region 312 includes a traffic condition around the vehicle, the speed of the vehicle, and the like.

The steering wheel 330 is used to control the steering amount of the control target vehicle in the leading mode. The accelerator pedal 340 is used to control the accelerator pedal position of the control target vehicle in the leading mode. The brake pedal 350 is used to control the brake pedal position of the control target vehicle in the leading mode. The microphone 360 is used to input voice information. The voice information input to the microphone 360 may be transmitted to the control target vehicle and reproduced in the vehicle.

The plurality of switches 370 are used to perform various inputs for providing the remote driving service. For example, the plurality of switches 370 include a switch for switching the control target vehicle, a switch for instructing a determination result of the operator in the assisting mode, a switch for switching a plurality of operation modes, and the like.

The remote driving device 200 described with reference to FIGS. 2 and 3 can provide both the leading mode and the assisting mode. Alternatively, the remote driving device 200 may be capable of providing only one of the leading mode and the support mode. In a case where the leading mode is not provided, the steering wheel 330, the accelerator pedal 340, and the brake pedal 350 can be omitted. In addition, a plurality of remote driving devices 200 may cooperate to provide the remote driving service. In this case, the remote driving device 200 may be able to hand over the vehicle to which the service is provided to another remote driving device 200.

Figure 4:
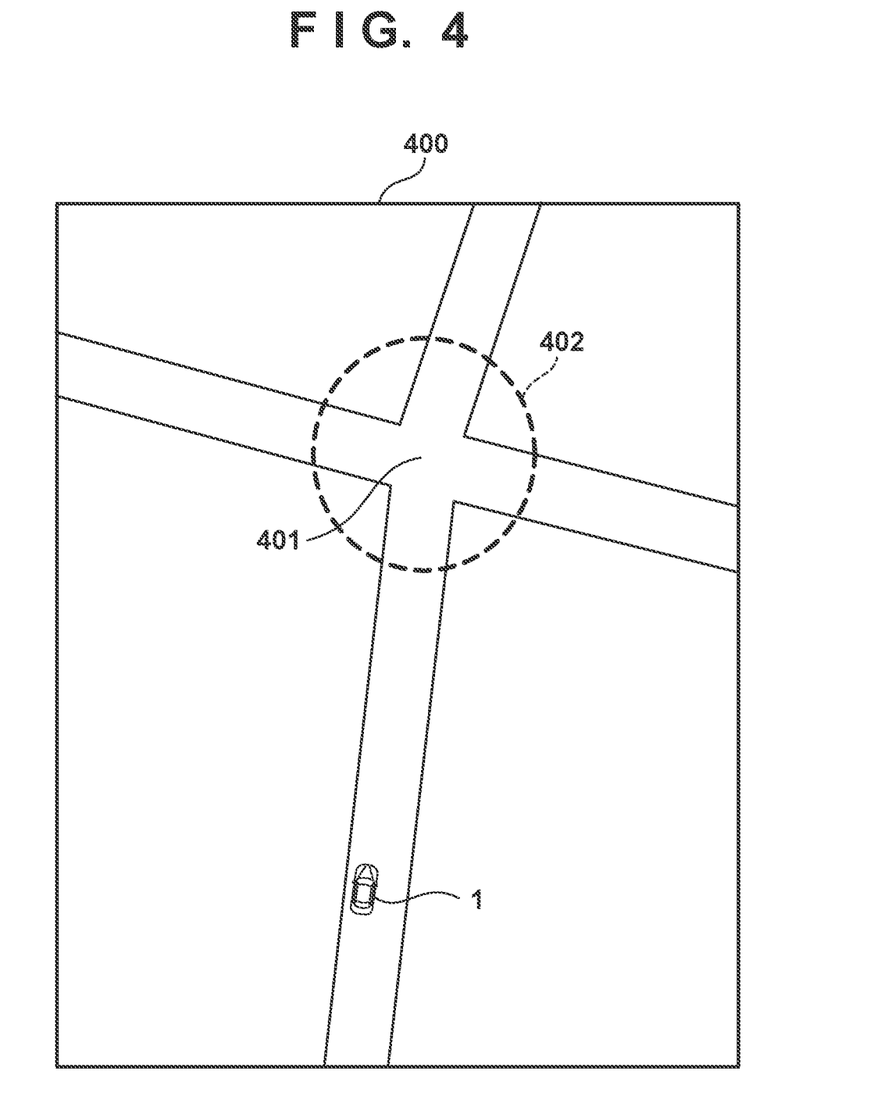
FIG. 4 is a diagram for describing an example of a delay suppression area according to the embodiment.

An outline of some embodiments of the present disclosure will be described with reference to FIG. 4. FIG. 4 illustrates an environment 400 around the vehicle 1 in the actual environment. It is assumed that the vehicle 1 is traveling on a road while receiving the remote driving service. There is an intersection 401 in a traveling direction of the vehicle 1. At the intersection 401, the vehicle 1 may turn right or left while determining a situation of a pedestrian or an oncoming vehicle, or the oncoming vehicle may turn right (when traveling on the left side) in front of the vehicle 1 traveling straight. Therefore, when the vehicle 1 travels at the intersection 401, it is necessary to transmit and receive data more timely as compared with a case where the vehicle 1 travels on a straight portion. In a case where communication of the vehicle 1 is delayed while the vehicle 1 is near the intersection 401, a traveling control of the vehicle 1 becomes complicated. Therefore, in some embodiments, the ECU 20 restricts the vehicle 1 from performing an operation that induces occurrence of a communication delay when the vehicle 1 is in an area 402 near the intersection 401.

An area where the occurrence of the communication delay is to be suppressed, such as the area 402 near the intersection 401, is referred to as a delay suppression area. The delay suppression area may be an area where occurrence of a communication delay in communication between the vehicle 1 and an external device (for example, the remote driving device 200 or a communication device installed on a road shoulder) is to be suppressed. In addition, the operation that induces the occurrence of the communication delay is referred to as a delay inducing operation. The delay inducing operation may include, for example, handover of communication and/or transmission and reception of data that is not used for the traveling control (for example, pre-reading of map data or download of video). Transmission and reception of data used for the traveling control of the vehicle 1, such as transmission of surrounding environment data and reception of an operation instruction from the remote driving device 200, do not have to be regarded as the delay inducing operation.

A delay suppression table 500 will be described as an example of the information specifying the delay suppression area with reference to FIG. 5A. The delay suppression table 500 is created, for example, before the vehicle 1 starts traveling, and is stored in the memory 20b of the ECU 20. The delay suppression table 500 specifies the delay suppression area for each operation mode of the vehicle 1. A column 501 indicates the operation mode of the vehicle 1. "Remote driving mode" is an operation mode in which the vehicle 1 is traveling while receiving the remote driving service from the remote driving device 200. "Automated driving mode" is an operation mode in which the vehicle 1 is traveling by the ECU 20. "Manual driving mode" is an operation mode in which the vehicle 1 is traveling by an operation input made by the driver.

Each of columns 502 to 504 indicates the delay suppression area for each operation mode. In the example of FIG. 5A, three types of delay suppression areas are illustrated, but other delay suppression areas may be set. The column 502 ("intersection") indicates whether or not an area near the intersection is set as the delay suppression area as described with reference to FIG. 4. In a case where the vehicle 1 is in the remote driving mode, an area within 50 m from the intersection is set as the delay suppression area. In a case where the vehicle 1 is in the automated driving mode, an area within 30 m from the intersection is set as the delay suppression area. Since the remote driving mode is more susceptible to the delay than the automated driving mode, the delay suppression area for the remote driving mode is set to be wider than the delay suppression area for the automated driving mode. In other words, the delay suppression area for the automated driving mode is narrower than the delay suppression area for the remote driving mode. In a case where the vehicle 1 is in the manual driving mode, the delay suppression area is not set based on the intersection. That is, the delay suppression area for the automated driving mode is set to be narrower than the delay suppression area for the manual driving mode.

The column 503 ("steering-planned area") indicates whether or not an area where steering of the vehicle 1 is planned is set as the delay suppression area. In a case where the vehicle 1 is in the remote driving mode, the area where the steering of the vehicle 1 is planned is set as the delay suppression area. In a case where the vehicle 1 is in the automated driving mode or the manual driving mode, the area where the steering of the vehicle 1 is planned is not set as the delay suppression area. In the remote driving service in the assisting mode, the operator of the remote driving device 200 determines whether or not a lane change planned by the ECU 20 of the vehicle 1 is allowed. In order for the operator to make an accurate determination, information on the surrounding of the vehicle 1 and an operation instruction for the vehicle 1 need to be communicated without delay. Therefore, in the remote driving mode, an area where a behavior accompanied by steering such as a lane change is planned is set as the delay suppression area.

The column 504 ("pedestrian caution area") indicates whether or not an area where a pedestrian is expected to suddenly appear is set as the delay suppression area. In a case where the vehicle 1 is in the remote driving mode or the automated driving mode, the area where a pedestrian is expected to suddenly appear is set as the delay suppression area. In a case where the vehicle 1 is in the manual driving mode, the area where a pedestrian is expected to suddenly appear is not set as the delay suppression area. The area where a pedestrian is expected to suddenly appear may include, for example, an area along a school zone or an area near a park.

A delay suppression table 510 will be described as another example of the information specifying the delay suppression area with reference to FIG. 5B. The delay suppression table 510 is created, for example, before the vehicle 1 starts traveling, and is stored in the memory 20b of the ECU 20. Columns 511 to 514 of the delay suppression table 510 specify the same contents as the column 501 to 504 of the delay suppression table 500.

Figure 5A:
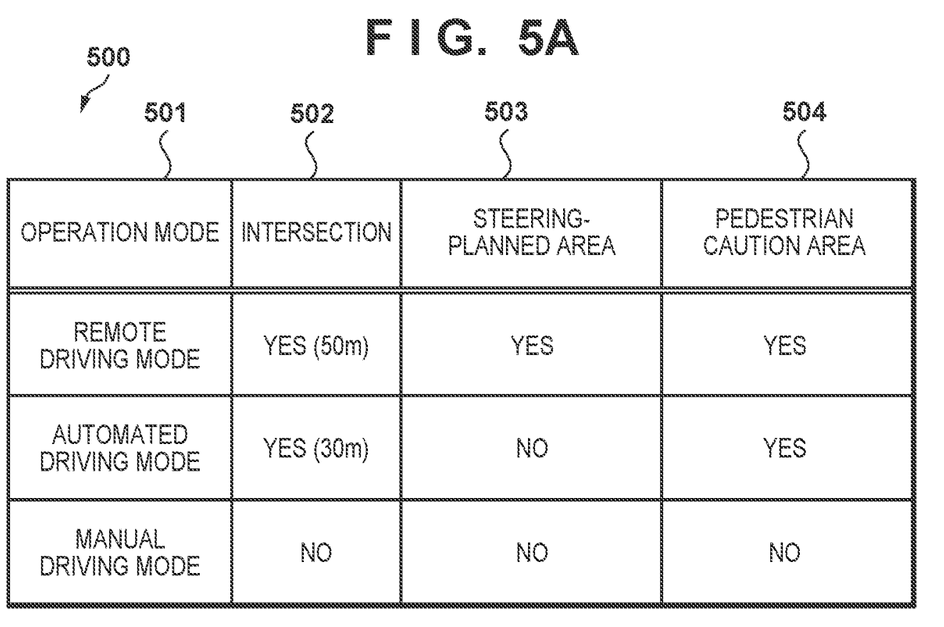
FIG. 5A is a diagram for describing an example of the delay suppression table according to the embodiment.

In the example of FIG. 5A, the delay suppression area for the remote driving mode is set to be wider than the delay suppression area for the automated driving mode. In the example of FIG. 5B, the delay suppression area for the remote driving mode is set to be narrower than the delay suppression area for the automated driving mode. For example, in a case where the vehicle 1 is in the remote driving mode, an area within 30 m from the intersection is set as the delay suppression area. In a case where the vehicle 1 is in the automated driving mode, an area within 50 m from the intersection is set as the delay suppression area. Such setting is made because the remote driving mode may be less susceptible to the delay than the automated driving mode. Instead of the examples of FIGS. 5A and 5B, the delay suppression area for the remote driving mode may be the same as the delay suppression area for the automated driving mode.

A delay suppression table 520 will be described as another example of the information specifying the delay suppression area with reference to FIG. 5C. The delay suppression table 520 is created, for example, before the vehicle 1 starts traveling, and is stored in the memory 20b of the ECU 20. Columns 521 to 524 of the delay suppression table 520 specify the same contents as the column 501 to 504 of the delay suppression table 500. In the delay suppression table 520, the remote driving mode is set separately for the leading mode and the assisting mode described above. The operation modes other than the remote driving mode may be the same as those in FIG. 5A or 5B, and thus, a description thereof is omitted in FIG. 5C.

The delay suppression area for the remote driving mode in the assisting mode of the vehicle 1 is set to be narrower than the delay suppression area for the automated driving mode in the leading mode of the vehicle 1. For example, in a case where the vehicle 1 is in the remote driving mode in the leading mode, an area within 40 m from the intersection is set as the delay suppression area. In a case where the vehicle 1 is in the remote driving mode in the assisting mode, an area within 30 m from the intersection is set as the delay suppression area. Such setting is made because the assisting mode may be less susceptible to the delay than the leading mode.

Further, the steering-planned area is set as the delay suppression area in the remote driving mode in the assisting mode of the vehicle 1, whereas the steering-planned area is not set as the delay suppression area in the automated driving mode in the leading mode of the vehicle 1. This is because, in the assisting mode, steering is performed under the control of the ECU 20 for automated driving, and thus it is considered that a delay is allowed.

A delay suppression table 530 will be described as another example of the information specifying the delay suppression area with reference to FIG. 5D. The delay suppression table 530 is created, for example, before the vehicle 1 starts traveling, and is stored in the memory 20b of the ECU 20. The delay suppression table 530 determines the delay inducing operation for each operation mode of the vehicle 1, each delay suppression area, and each communication situation (in the example of FIG. 5D, a delay state). Similarly to the column 501, a column 531 indicates the operation mode of the vehicle 1.

A column 532 ("suppression area") indicates the delay suppression area. In the example of the delay suppression table 530, the vicinity of a point A (for example, the vicinity of a certain intersection) and the vicinity of a point B (for example, the vicinity of another intersection) are set as the delay suppression areas. A column 533 ("area size") indicates the size of the delay suppression area. For example, a record in the first row indicates that an area within 50 m from the point A is set as the delay suppression area. As shown in the delay suppression table 530, the delay suppression area for the manual driving mode is narrower than the delay suppression area for the automated driving mode. The delay suppression area for the manual driving mode is narrower than the delay suppression area for the remote driving mode. Furthermore, the suppression area for the automated driving mode is narrower than the delay suppression area for the remote driving mode.

A column 534 ("delay state") indicates the delay state serving as a determination criterion for the delay inducing operation for each delay suppression area. The determination criterion may be different for each delay suppression area. A column 535 ("handover") indicates whether handover of communication is allowed or restricted in the delay suppression area. A column 536 ("download") indicates whether download of video or the like is allowed or restricted in the delay suppression area.

As indicated in the record in the first row, in a case where the operation mode is the remote driving mode, the delay suppression area is the area within 50 m from the point A, and the delay of the vehicle 1 is 10 ms or more, the vehicle 1 is suppressed from performing the handover of communication. That is, in this situation, the handover of communication is determined as the delay inducing operation, and thus is restricted. As indicated in a record in the second row, in a case where the operation mode is the remote driving mode, the delay suppression area is the area within 50 m from the point A, and the delay of the vehicle 1 is less than 10 ms, the vehicle 1 is allowed to perform the handover of communication. That is, in this situation, the handover of communication is not determined as the delay inducing operation, and thus is allowed. As described above, the delay inducing operation that is restricted by the control device 2 is determined based on the communication situation (for example, a delay) in the delay suppression area.

As can be seen from a comparison between the record of the first row and a record of the third row, even in a case where the operation mode and the delay are the same, that is, the operation mode is the remote operation mode and the delay is 20 ms, when the vehicle 1 is in the vicinity of the point A, the handover is restricted, and when the vehicle 1 is in the vicinity of the point B, the handover is allowed. As described above, the delay inducing operation that is restricted by the control device 2 is determined for each delay suppression area.

A delay suppression table 540 will be described as another example of the information specifying the delay suppression area with reference to FIG. 5E. The delay suppression table 540 is created, for example, before the vehicle 1 starts traveling, and is stored in the memory 20b of the ECU 20. Columns 541 to 546 of the delay suppression table 540 specify the same contents as the column 531 to 536 of the delay suppression table 530.

Figure 5B:
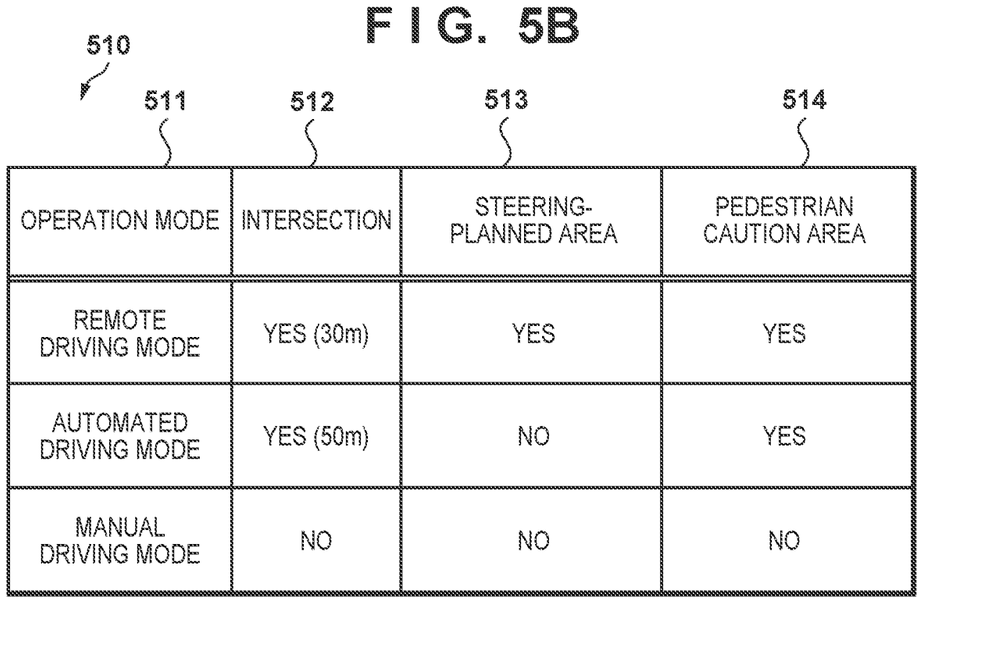
FIG. 5B is a diagram for describing an example of the delay suppression table according to the embodiment.
Figure 5C:
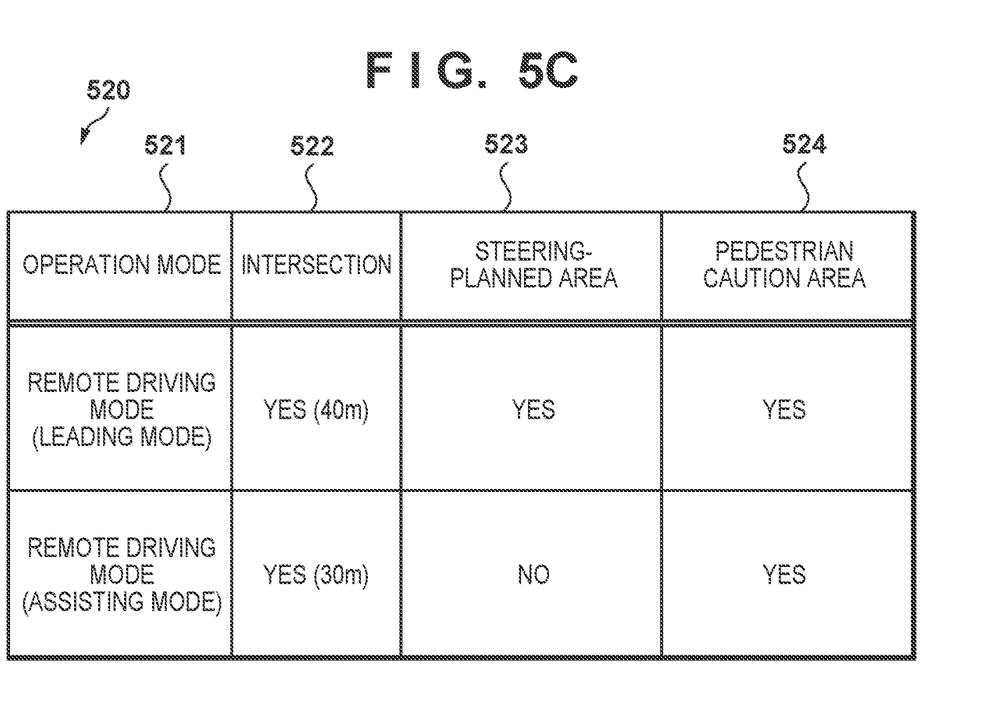
FIG. 5C is a diagram for describing an example of the delay suppression table according to the embodiment.
Figure 5D:
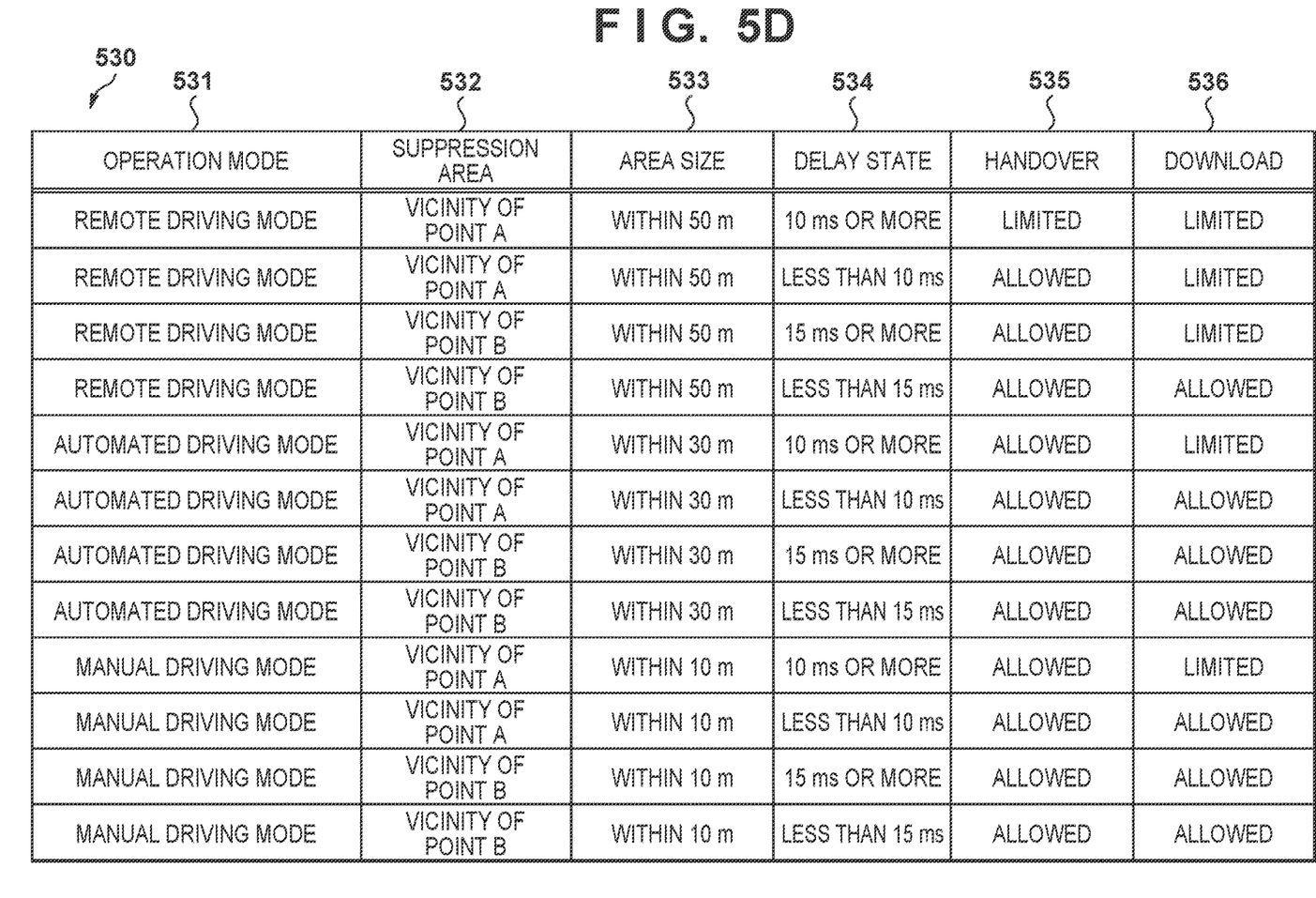
FIG. 5D is a diagram for describing an example of the delay suppression table according to the embodiment.
Figure 5E:
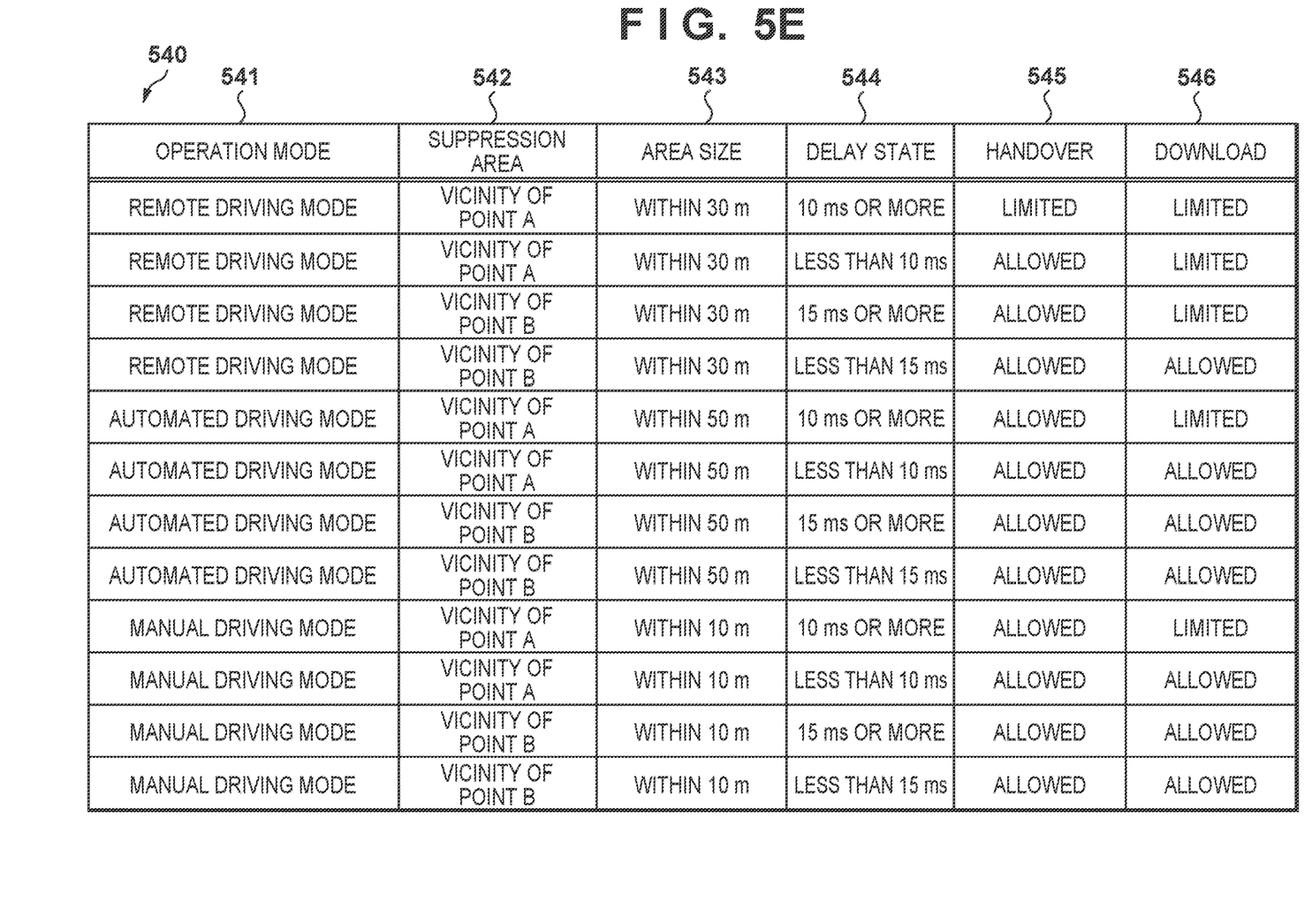
FIG. 5E is a diagram for describing an example of the delay suppression table according to the embodiment.

In the example of FIG. 5E, similarly to the example of FIG. 5B, the delay suppression area for the remote driving mode is set to be narrower than the delay suppression area for the automated driving mode at each of a plurality of points. For example, in a case where the vehicle 1 is in the remote driving mode, an area within 30 m from the point A is set as the delay suppression area. In a case where the vehicle 1 is in the automated driving mode, an area within 50 m from the point A is set as the delay suppression area. Instead of the examples of FIGS. 5D and 5E, the delay suppression area for the remote driving mode may be the same as the delay suppression area for the automated driving mode. Furthermore, also in the examples of FIGS. 5D and 5E, similarly to the example of FIG. 5C, the remote driving mode may be set separately for the leading mode and the assisting mode described above.

Figure 6:
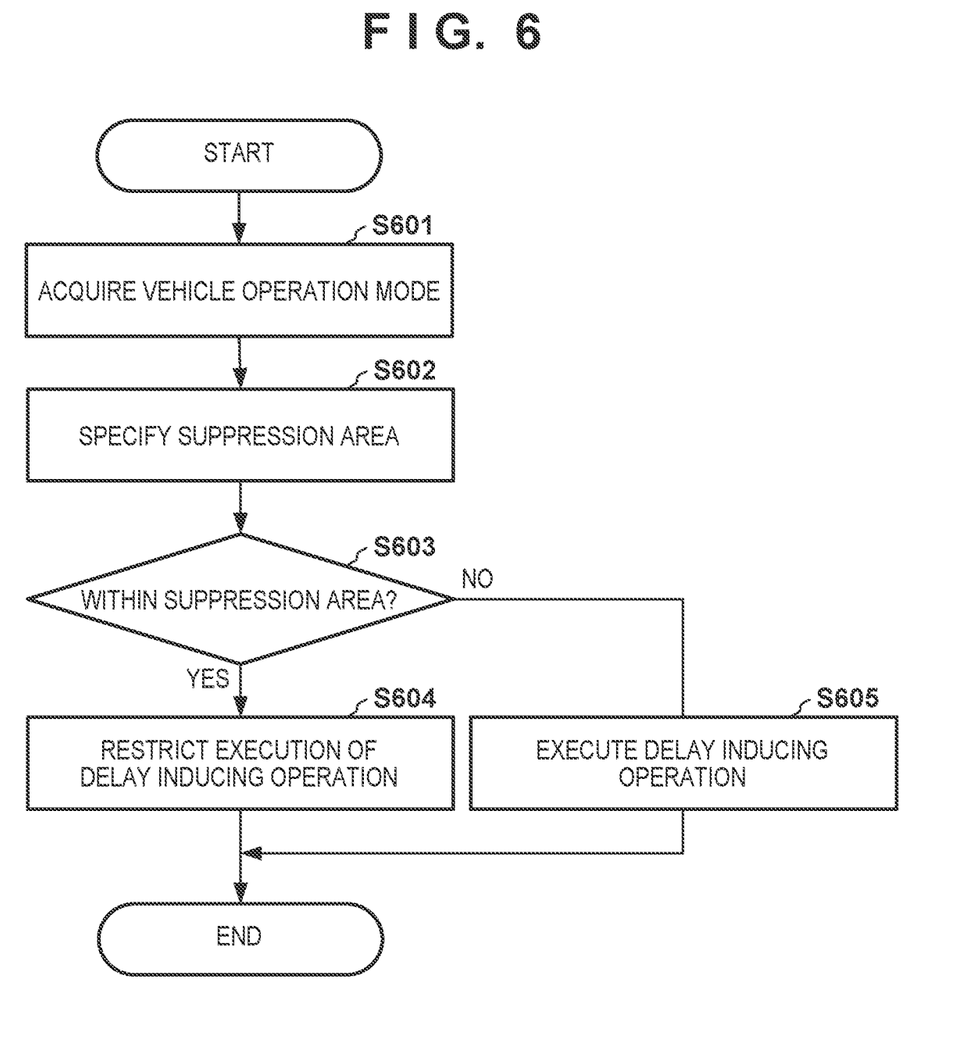
FIG. 6 is a flowchart for describing an example of a control method according to the embodiment.

A control method for the vehicle 1 will be described with reference to FIG. 6. This method may be executed by the control device 2 (specifically, the processor 20a) of the vehicle 1 executing a program stored in a memory (for example, the memory 20b). Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The control method of FIG. 6 is repeatedly executed while the vehicle 1 is traveling.

In step S601, the control device 2 acquires the current operation mode of the vehicle 1. As described above, the operation mode includes the remote driving mode, the automated driving mode, the manual driving mode, and the like. In step S602, the control device 2 specifies the delay suppression area for the current operation mode based on the delay suppression table 500 or the delay suppression table 530 stored in advance in the control device 2.

In step S603, the control device 2 determines whether or not the current position of the vehicle 1 is included in the delay suppression area. In a case where the current position is included in the delay suppression area ("YES" in step S603), the control device 2 shifts the processing to step S604, and otherwise, the control device 2 shifts the processing to step S605. In a case where the control device 2 restricts the delay inducing operation based on the delay suppression table 530, in step S603, the control device 2 determines the delay suppression area based on not only the operation mode of the vehicle 1 but also the current delay state of the vehicle 1.

In step S604, the control device 2 restricts the vehicle 1 from performing the delay inducing operation. For example, in a case where the vehicle 1 is within the delay suppression area, the control device 2 restricts the communication device of the vehicle 1 from performing the handover, or interrupts reproduction of music and movies by streaming. In step S605, the control device 2 performs the delay inducing operation.

The control device 2 may execute the delay inducing operation in advance when the vehicle 1 is approaching the delay suppression area. The control device 2 may perform the delay inducing operation when the vehicle 1 is outside the delay suppression area. For example, the control device 2 may download map data of the delay suppression area in advance.

In the above-described embodiment, the control device 2 mounted on the vehicle 1 executes the control method of FIG. 6. Alternatively, a control device (for example, the remote driving device 200) outside the vehicle 1 may execute the control method of FIG. 6. In addition, the control method of FIG. 6 may be applied to a mobile object (for example, an unmanned aerial vehicle such as a drone) other than the vehicle.

SUMMARY OF EMBODIMENT

<Configuration 1>
A control device (2) of a mobile object (1), the control device including: control means (S604) that restricts, based on information (500, 510, 520, 530, and 540) specifying a suppression area where occurrence of a communication delay is to be suppressed, the mobile object from performing an operation that induces a communication delay in the suppression area.

With this configuration, it is possible to suppress the occurrence of the communication delay in a specific area.

<Configuration 2>
The control device according to Configuration 1, wherein the control means performs the operation that induces the communication delay when the mobile object is outside the suppression area (S605).

With this configuration, the delay inducing operation can be performed while suppressing the occurrence of the communication delay.

<Configuration 3>
The control device according to Configuration 1 or 2, wherein the mobile object is a vehicle (1), and
the suppression area includes at least one of an area (503) where a behavior accompanied by steering is planned, an area (504) where a pedestrian is expected to suddenly appear, or an area (502) near an intersection.

With this configuration, it is possible to suppress the occurrence of the communication delay in the listed areas.

<Configuration 4>
The control device according to any one of Configurations 1 to 3, wherein the information specifies the suppression area relating to a predetermined point for each operation mode of the mobile object.

With this configuration, it is possible to appropriately suppress the occurrence of the communication delay for each operation mode.

<Configuration 5>
The control device according to any one of Configurations 1 to 4,
wherein the mobile object is a vehicle (1), and
a suppression area relating to a predetermined point for a manual driving mode of the mobile object is narrower than a suppression area relating to the predetermined point for an automated driving mode of the mobile object.

With this configuration, an appropriate suppression area can be set for each driving mode.

<Configuration 6>
The control device according to any one of Configurations 1 to 5,
wherein the mobile object is a vehicle (1), and
a suppression area relating to a predetermined point for a manual driving mode of the mobile object is narrower than a suppression area relating to the predetermined point for a remote driving mode of the mobile object.

With this configuration, an appropriate suppression area can be set for each driving mode.

<Configuration 7>
The control device according to any one of Configurations 1 to 6,
wherein the mobile object is a vehicle (1), and
a suppression area relating to a predetermined point for an automated driving mode of the mobile object is narrower than a suppression area relating to the predetermined point for a remote driving mode of the mobile object.

With this configuration, an appropriate suppression area can be set for each driving mode.

<Configuration 8>
The control device according to any one of Configurations 1 to 6,
wherein the mobile object is a vehicle (1), and
a suppression area relating to a predetermined point for an automated driving mode of the mobile object is wider than a suppression area relating to the predetermined point for a remote driving mode of the mobile object.

With this configuration, an appropriate suppression area can be set for each driving mode.

<Configuration 9>
The control device according to any one of Configurations 1 to 8,
wherein the mobile object is a vehicle (1), and
a suppression area relating to a predetermined point for a remote driving mode in an assisting mode of the mobile object is narrower than a suppression area relating to the predetermined point for a remote driving mode in a leading mode of the mobile object.

With this configuration, an appropriate suppression area can be set for each driving mode.

<Configuration 10>
The control device according to any one of Configurations 1 to 9,
wherein the mobile object is a vehicle (1), and
the control means restricts the operation that induces a communication delay in a case where the vehicle is in a predetermined driving mode.

With this configuration, operability of the operator in the remote driving mode can be improved.

<Configuration 11>
The control device according to any one of Configurations 1 to 10, wherein the operation that induces a communication delay includes handover of communication.

With this configuration, it is possible to suppress the occurrence of the communication delay due to the handover.

<Configuration 12>
The control device according to any one of Configurations 1 to 11, wherein the control means restricts the operation that induces a communication delay further based on a communication situation in the suppression area.

With this configuration, the delay inducing operation can be prevented from being excessively suppressed.

<Configuration 13>
The control device according to any one of Configurations 1 to 12, wherein the operation that is restricted by the control means is determined based on a communication situation in the suppression area.

With this configuration, the delay inducing operation can be more appropriately determined.

<Configuration 14>
The control device according to any one of Configurations 1 to 13, wherein the operation that is restricted by the control means is determined for each suppression area.

With this configuration, the delay inducing operation can be more appropriately determined.

<Configuration 15>

A program for causing a computer to function as each means of the control device according to any one of Configurations 1 to 14.

With this configuration, the above configurations can be implemented in a form of a program.

<Configuration 16>

A method of controlling a mobile object (1), the method including:

a control step (S604) of restricting, based on information (500, 510, 520, 530, and 540) specifying a suppression area where occurrence of a communication delay is to be suppressed, the mobile object from performing an operation that induces a communication delay in the suppression area.

With this configuration, it is possible to suppress the occurrence of the communication delay in a specific area.

The invention is not limited to the foregoing embodiments, and various variations/changes are possible within the spirit of the invention.

What is claimed is:

1. A control device of a vehicle, the control device comprising:
    a control unit configured to restrict, based on information specifying a suppression area where occurrence of a communication delay is required to be suppressed, the vehicle from performing an operation that induces a communication delay in the suppression area, wherein
    the vehicle is configured to operate in a manual driving mode, an automated driving mode, and a remote driving mode; and
    the information specifies the suppression area relating to a predetermined point for each of the manual driving mode, the automated driving mode, and the remote driving mode, the suppression area where occurrence of a communication delay is required to be suppressed for the remote driving mode being larger than the suppression area where occurrence of a communication delay is required to be suppressed for the automated driving mode, the suppression area where occurrence of a communication delay is required to be suppressed for the automated driving mode being larger than the suppression area where occurrence of a communication delay is required to be suppressed for the manual driving mode.

2. The control device according to claim 1, wherein the control unit performs the operation that induces the communication delay when the vehicle is outside the suppression area.

3. The control device according to claim 1, wherein the suppression area includes at least one of an area where a behavior accompanied by steering is planned, an area where a pedestrian is expected to suddenly appear, or an area near an intersection.

4. The control device according to claim 1, wherein a suppression area relating to a predetermined point for the manual driving mode is narrower than a suppression area relating to the predetermined point for the automated driving mode.

5. The control device according to claim 1, wherein a suppression area relating to a predetermined point for the manual driving mode is narrower than a suppression area relating to the predetermined point for the remote driving mode.

6. The control device according to claim 1, wherein a suppression area relating to a predetermined point for the automated driving mode is narrower than a suppression area relating to the predetermined point for the remote driving mode.

7. The control device according to claim 1, wherein a suppression area relating to a predetermined point for the automated driving mode is wider than a suppression area relating to the predetermined point for the remote driving mode.

8. The control device according to claim 1, wherein a suppression area relating to a predetermined point for the remote driving mode in an assisting mode of the vehicle is narrower than a suppression area relating to the predetermined point for the remote driving mode in a leading mode of the vehicle.

9. The control device according to claim 1, wherein the control unit restricts the operation that induces a communication delay in a case where the vehicle is in a predetermined driving mode.

10. The control device according to claim 1, wherein the operation that induces a communication delay includes handover of communication.

11. The control device according to claim 1, wherein the control unit restricts the operation that induces a communication delay further based on a communication situation in the suppression area.

12. The control device according to claim 1, wherein the operation that is restricted by the control unit is determined based on a communication situation in the suppression area.

13. The control device according to claim 1, wherein the operation that is restricted by the control unit is determined for each suppression area.

14. A non-transitory storage medium comprising a program for causing a computer to function as each unit of the control device according to claim 1.

15. A method of controlling a vehicle, the method comprising:
    restricting, based on information specifying a suppression area where occurrence of a communication delay is required to be suppressed, the vehicle from performing an operation that induces a communication delay in the suppression area, wherein
    the vehicle is configured to operate in a manual driving mode, an automated driving mode, and a remote driving mode; and
    the information specifies the suppression area relating to a predetermined point for each of the manual driving mode, the automated driving mode, and the remote driving mode, the suppression area where occurrence of a communication delay is required to be suppressed for the remote driving mode being larger than the suppression area where occurrence of a communication delay is required to be suppressed for the automated driving mode, the suppression area where occurrence of a communication delay is required to be suppressed for the automated driving mode being larger than the suppression area where occurrence of a communication delay is required to be suppressed for the manual driving mode.

16. The control device according to claim 1, wherein
    in the remote driving mode,
        downloading data and performing a handover of communication are restricted when the communication delay is larger than a threshold, and
        downloading data is restricted and performing a handover of communication is allowed when the communication delay is smaller than the threshold, and in the automated driving mode and the manual driving mode,
downloading data is restricted and performing a handover of communication is allowed when the communication delay is larger than the threshold, and
downloading data and performing a handover of communication are allowed when the communication delay is smaller than the threshold.

\* \* \* \* \*